June 4, 1929.　　　　　F. COAN　　　　　1,715,593
ADJUSTABLE MASK FOR CAMERAS
Filed Oct. 18, 1927
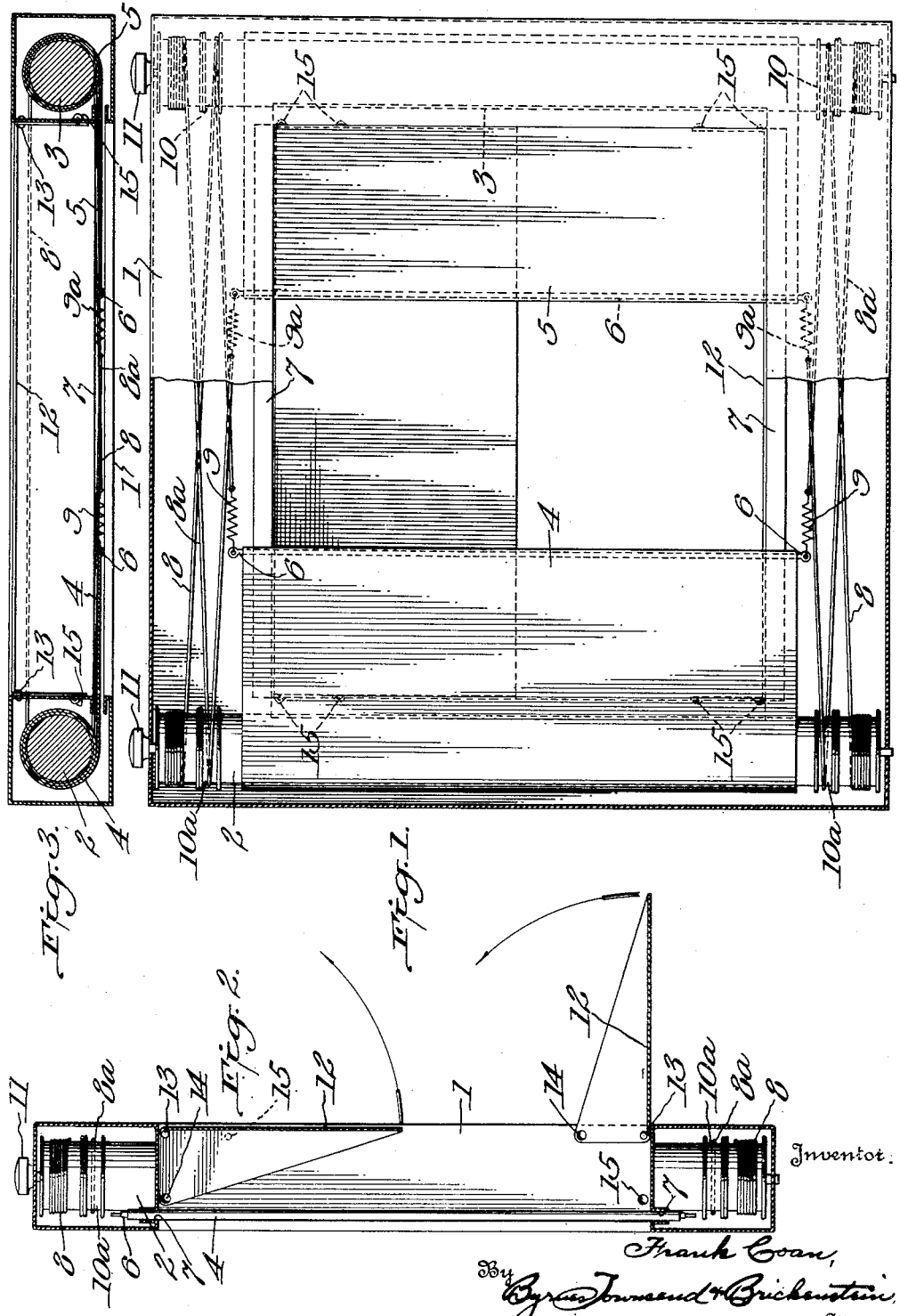

Patented June 4, 1929.  1,715,593

UNITED STATES PATENT OFFICE.

FRANK COAN, OF BELLAIRE PARK, NEW YORK.

ADJUSTABLE MASK FOR CAMERAS.

Application filed October 18, 1927. Serial No. 226,988.

This invention relates to adjustable masks for cameras, and more particularly to an adjustable mask which may be employed as an attachment to cameras used in photo-engraving work for permitting the exposure of as much or as little of a full sized plate as may be required for the particular work in hand.

Cameras for photo-engraving work are frequently provided with four adjustable shutters or masks which may be turned to obscure the different quarters of the plate. Devices of this type enable the operator to make four exposures on a plate, but do not permit the most economical use of the plates since the work may cover much less than one-fourth of the plate.

An object of the present invention is to provide an adjustable mask which will permit the successive exposure of any desired portions of the plates. More specifically an object is to provide an adjustable mask which may take the form of a frame for attachment to a camera body, the frame being provided with a plurality of flexible opaque screens which may be positioned to obstruct more or less of the opening through the frame.

These and other objects of the invention will be apparent from the following specification when taken with the accompanying drawings, in which Fig. 1 is an elevation, partly in section, of the adjustable mask as viewed from the rear or plate-holder side thereof, Fig. 2 is a central vertical section, and Fig. 3 is a central horizontal section through the adjustable mask.

In the accompanying drawings the invention is illustrated as embodied in an attachment for use with a camera, but it will be understood that the invention may be built into or made a permanent part of the camera.

In the drawings, the numeral 1 indicates a frame or housing which is adapted to be clamped at the back of a camera, in front of the usual plate holder. A pair of parallel rollers 2, 3 are arranged at opposite sides of the frame and the inner ends of flexible opaque screens 4, 5 are secured to the respective rollers. The outer edges of the screens are reinforced by rods 6, which project beyond the screens to engage in parallel guides 7, 7.

Cords 8 are wound upon the ends of roller 2 and the opposite ends of the cords are secured to the screen 4 through springs 9, the connection preferably being made to the projecting ends of the rod 6. The intermediate portions of cords 8 extend towards the opposite side of the frame and pass around idler pulleys 10 which are preferably loosely mounted on the roller 3. The cords are so wound upon roller 2, and the tension of the springs 9 is such that the screen is held in tightly stretched condition and its forward edge partakes of a parallel line motion, as the screen is wound upon or unwound from the roller 2.

A similar arrangement of cords $8^a$, springs $9^a$ and pulleys $10^a$ is employed in connection with roller 3 and screen 5.

The screens may be adjusted by moving rods 6 to the right or left, or the rollers 2, 3 may be provided with operating knobs 11. By a suitable positioning of the outer edges of the screens, the exposure may be confined to a vertical strip of any desired width and at any portion of the plate.

The same arrangement could be duplicated to effect a sub-division of the plate into horizontal zones, but in actual practice I have found that a horizontal division of the plate into two zones is usually sufficient to effect marked economies when the subdividing in the other direction is closely regulated.

The masks for dividing the plate horizontally take the form of two plates 12 which are pivoted to the frame 1 at 13, i. e., along the upper and lower edges of the opening through the frame, and at the forward face thereof. The plates 12 extend across the full opening and have a height equal to approximately one-half the depth of the opening. In addition to the rectangular portions which form the mask per se, the plates 12 have triangular portions 13 which lie along the walls of the opening when the plates are in closed or masking position, the portions 13 being formed with projections 14 which, due to the resiliency of the side portions 13, engage in depressions 15 in the frame, to hold the plates 12 in open or in closed position.

As shown in Figs. 1 and 2, the upper mask has been turned into closed or masking position, while the lower mask is turned forwardly to expose the lower half of the opening. When in their forward or inoperative position, the masks 12 lie within the bellows or in that portion of the camera body to which the frame 1 is secured.

Although I prefer to employ vertical rollers placed at the sides of the frame, in combination with rigid masks which are pivoted upon horizontal axes, it is obvious that the relative position of the screens and pivot masks may be interchanged. It is therefore to be understood that in the following claims, the terms "sides, top and bottom" of the frame are employed in a descriptive sense and are not intended to limit the invention to the specific arrangement which is shown in the drawings.

It will be apparent that the invention is not limited to the specific embodiment which is described above, as various changes may be made in the several parts, their relative size, shape and location without departing from the spirit of my invention as set forth in the following claims.

I claim:

1. An adjustable mask comprising a frame adapted to be secured to the rear of a camera body, a pair of parallel rollers at opposite sides of the said frame, an opaque screen carried by each of said rollers, means at the outer edge of each screen for reinforcing the same, a pair of cords for each roller, each of said cords having one end wound upon an end of a roller, its opposite end secured to the corresponding end of the screen which is carried by the said roller, and having its intermediate portion extending to the side of said frame opposite the said roller, and idler pulleys at the sides of said frame for supporting the said intermediate portions of the several cords.

2. The invention as set forth in claim 1, wherein spring members are provided in the connections between each of said cords and its respective screen, whereby the said screens are continuously maintained in stretched position.

3. The invention as set forth in claim 1, wherein said reinforcing means comprise rods attached to the outer edge of and projecting beyond the said screens, and guides are provided for the said projecting ends of said rods.

4. An adjustable mask attachment comprising a frame adapted to be secured to the rear of a camera body, a pair of parallel rollers at opposite sides of said frame, opaque screens on said rollers, means supporting the outer edges of said screens for parallel line movement across the said frame, and rigid masks pivoted to the said frame at the forward upper and lower edges, respectively, of the opening therethrough, said masks each being of such shape and size to obstruct substantially one-half of said opening when positioned to lie parallel to said screens.

5. The invention as set forth in claim 4, wherein each of said masks comprises a metal plate having a rectangular central portion and side portions of triangular form, said triangular portions lying along the walls of the opening through the frame when the said masks are turned into closed or masking position, and cooperating means on said triangular portions and on said frame for resiliently retaining said masks in open and closed position.

In testimony whereof, I affix my signature.

FRANK COAN.